United States Patent
Frazier et al.

(10) Patent No.: US 8,401,532 B2
(45) Date of Patent: Mar. 19, 2013

(54) METHOD FOR SIMULATING NETWORK HOLD

(75) Inventors: Taneka Frazier, Lilburn, GA (US); Marc Riley, Lawrenceville, GA (US)

(73) Assignee: Motorola Mobility LLC, Libertyville, IL (US)

( * ) Notice: Subject to any disclaimer, the term of this patent is extended or adjusted under 35 U.S.C. 154(b) by 596 days.

(21) Appl. No.: 12/510,574

(22) Filed: Jul. 28, 2009

(65) Prior Publication Data

US 2011/0028136 A1  Feb. 3, 2011

(51) Int. Cl.
*H04M 3/42* (2006.01)

(52) U.S. Cl. .............. 455/416; 455/550.1; 455/41.2; 379/205.01

(58) Field of Classification Search .............. 455/416, 455/550.1, 41.2; 379/205.01
See application file for complete search history.

(56) References Cited

U.S. PATENT DOCUMENTS

| | | | | |
|---|---|---|---|---|
| 5,987,318 A * | 11/1999 | Alperovich et al. | ......... | 455/416 |
| 2002/0193107 A1* | 12/2002 | Nascimento, Jr. | ............ | 455/426 |
| 2007/0242628 A1* | 10/2007 | Dutta et al. | ................... | 370/310 |
| 2008/0200159 A1 | 8/2008 | Lai | | |
| 2008/0220825 A1 | 9/2008 | Wu | | |

FOREIGN PATENT DOCUMENTS

WO  0143351 A2  6/2001

OTHER PUBLICATIONS

Patent Cooperation Treaty, "PCT Search Report and Written Opinion of the International Searching Authority" for International Application No. PCT/US2010/043475, Oct. 14, 2010, 13 pages.
Uniden America Corp., TRU9385 Series Owner's Manual, 2007, Fort Worth, Texas.

* cited by examiner

*Primary Examiner* — Danh Le

(57) ABSTRACT

A method, a master short range accessory, and an ad-hoc personal area network device for pairing with multiple slave communication devices are disclosed. An audio user interface 310 may interact with a user. A primary device interface component 372 may create a primary audio connection with a primary mobile communication device 502 to facilitate a primary telephone conversation session with a primary communication partner 512. A secondary device interface component 372 may create a secondary audio connection with the secondary mobile communication device 504 to facilitate a secondary telephone conversation session with a secondary communication partner 532 while maintaining the primary audio connection. A processor 330 may send an audio hold indication to the primary communication partner 512 and mutes the primary audio connection.

22 Claims, 7 Drawing Sheets

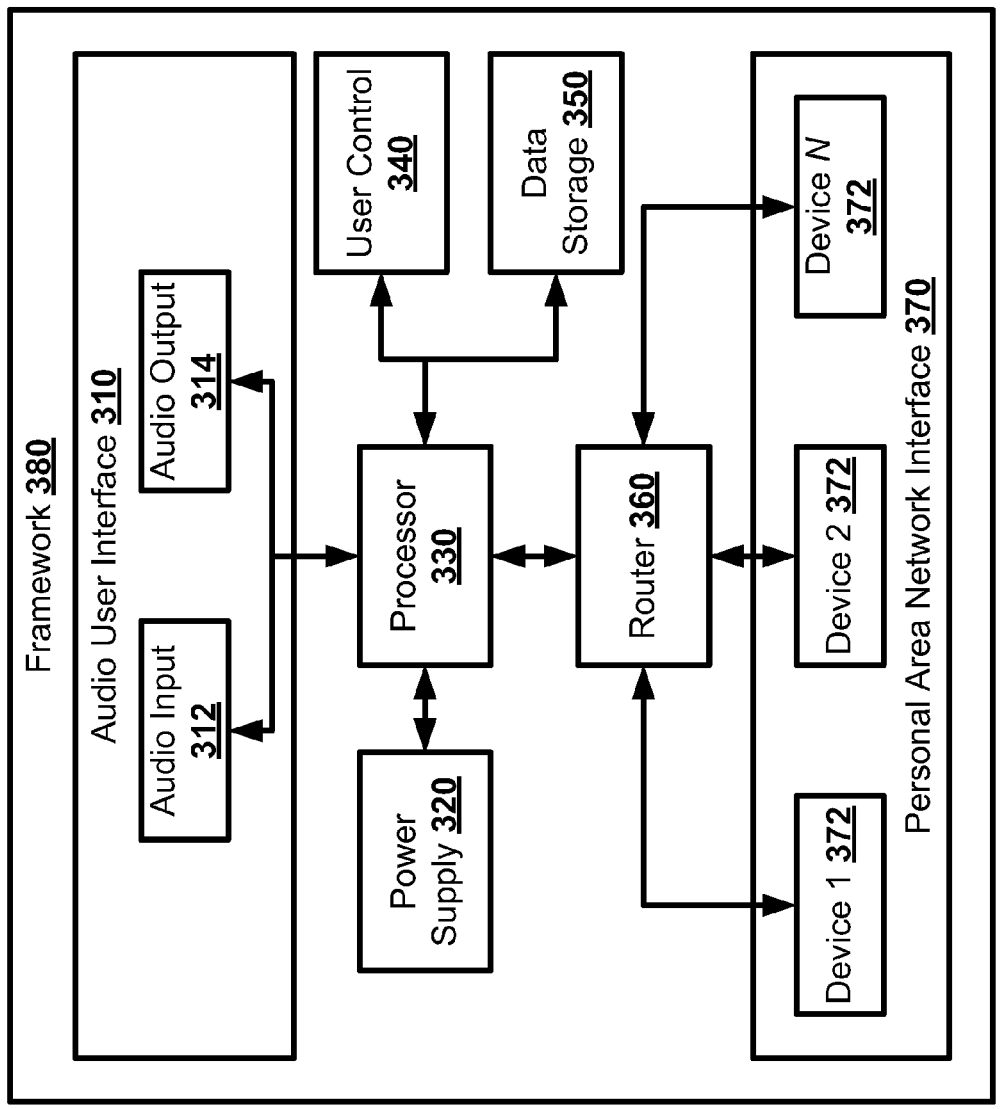

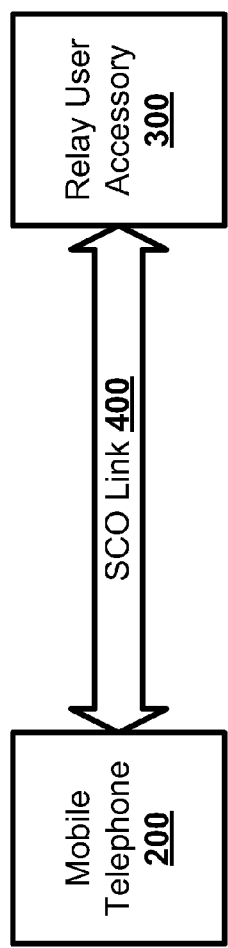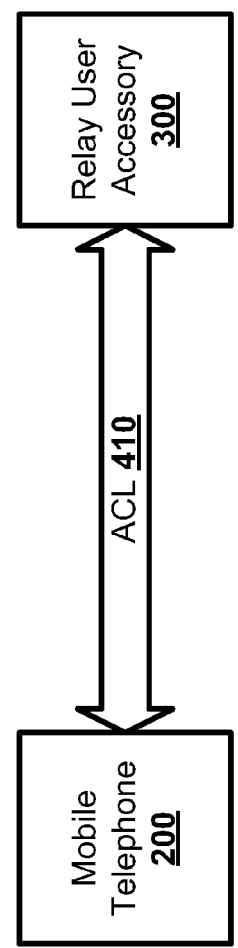

500
Figure 5a
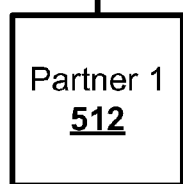
510
Figure 5b
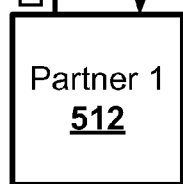
520
Figure 5c

METHOD FOR SIMULATING NETWORK HOLD

FIELD OF THE INVENTION

The present invention relates to a method and system for creating a simulated network hold. The present invention further relates to using a relay user interface accessory to create the simulated hold between two telecommunications device.

INTRODUCTION

Currently, a telephone network may institute a hold feature to handle multiple calls for a single phone. The hold feature may allow for two calls to remain active concurrently. Further, a user may use the hold feature to temporarily pause a telephone conversation, allowing a second matter to be dealt with before the conversation is resumed. The network may mute uplink and downlink audio of the call and generate an indicator, such as music, a beep, or a prompt, on the uplink for the call that is on hold so that the far side knows that the call is still in progress and has not ended. The status of the hold may typically be controlled at the telephone or network level.

SUMMARY OF THE INVENTION

A method, a master short range accessory, and an ad-hoc personal area network device for pairing with multiple slave communication devices are disclosed. An audio user interface may interact with a user. A primary device interface component may create a primary audio connection with a primary mobile communication device to facilitate a primary telephone conversation session with a primary communication partner. A secondary device interface component may create a secondary audio connection with the secondary mobile communication device to facilitate a secondary telephone conversation session with a secondary communication partner while maintaining the primary audio connection. A processor may send an audio hold indication to the primary communication partner and mute the primary audio connection.

BRIEF DESCRIPTION OF THE DRAWINGS

Understanding that these drawings depict only typical embodiments of the invention and are not therefore to be considered to be limiting of its scope, the invention will be described and explained with additional specificity and detail through the use of the accompanying drawings in which:

FIG. 3 illustrates, in a block diagram, one embodiment of a relay user interface accessory.

FIGS. 4a-b illustrate, in two block diagrams, different data links for transferring audio between a relay user interface accessory and a mobile telecommunication device.

FIGS. 5a-e illustrate, in a series of block diagrams, one embodiment of a simulated hold.

DETAILED DESCRIPTION OF THE INVENTION

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

The present invention comprises a variety of embodiments, such as a method, an apparatus, and an electronic device, and other embodiments that relate to the basic concepts of the invention. The electronic device may be any manner of computer, mobile device, or wireless communication device.

A method, a master short range accessory, and an ad-hoc personal area network device for pairing with multiple slave communication devices are disclosed. An audio user interface may interact with a user. A primary device interface component may create a primary audio connection with a primary mobile communication device to facilitate a primary telephone conversation session with a primary communication partner. A secondary device interface component may create a secondary audio connection with the secondary mobile communication device to facilitate a secondary telephone conversation session with a secondary communication partner while maintaining the primary audio connection. A processor may send an audio hold indication to the primary communication partner and mute the primary audio connection.

A communication device, such as a mobile telephone may use short range communication technology, such as Bluetooth®, to improve functionality and usability. Bluetooth®, and similar technology, may allow a user to create a personal area network, or piconet. The personal area network may be a network that connects multiple devices used by a single user. While the range of a personal area network may generally encompass a single user, multiple users may use the devices of a personal area network simultaneously. An example of a personal area network may be a network that encompasses a mobile telephone, a Bluetooth® headset, and a personal computer or laptop. A wireless personal area network may, by nature, be ad-hoc.

Figure 1:
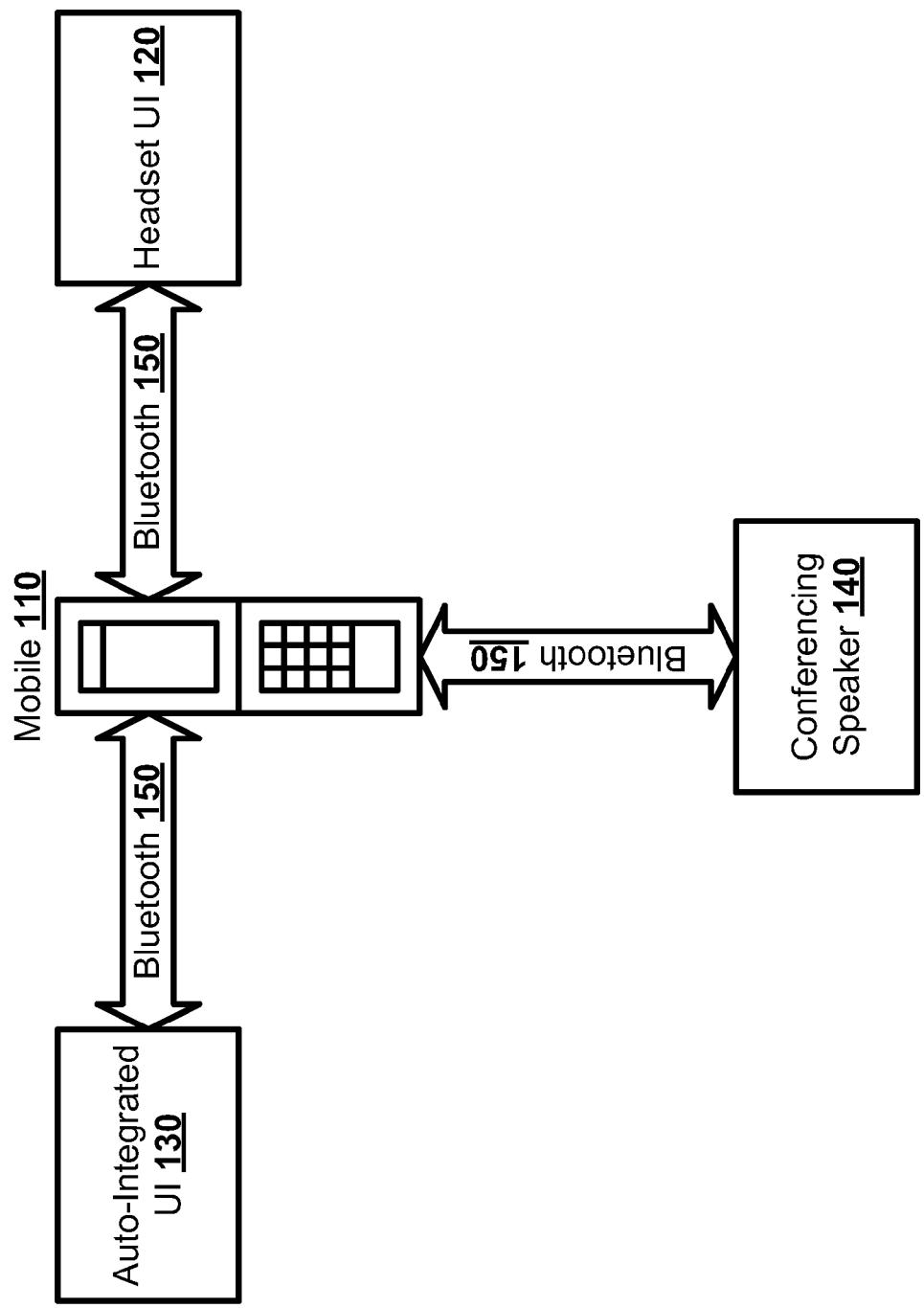
FIG. 1 illustrates, in a block diagram, one embodiment of a telecommunication device paired with various peripheral devices using a personal area network.

FIG. 1 illustrates one embodiment of a telecommunication device paired with various peripheral devices in a personal area network 100. A communication device 110 may pair with numerous peripheral devices to increase the usability of the communication device 110. The communication device 110 may be a mobile phone, a personal digital assistant, or other device that may connect a user to another user via a telecommunication network. For example, the communication device 110 may pair with a user interface accessory that relays audio data to and from the user, referred to herein as a relay user interface accessory. An example of a relay user interface accessory may be a headset user interface 120, an automobile-integrated user interface (UI) 130, and a conferencing speaker interface 140, and other user interface devices. A headset UI 120 may be a separate speaker and microphone molded to fit the head of a user so as to free up the hands of the user for other activities. An automobile-integrated UI 130 may be a separate speaker and microphone integrated into the interior of an automobile that allows a user to interact with a mobile phone 110 while keeping the hands of a user available for driving. A conferencing speaker interface 150 may be a speaker and microphone integrated into a table top device or integrated into a room that allows multiple parties to interact with a mobile phone.

A peripheral device may be paired with the communication device 110 using a wired connection or a wireless connection. The peripheral device may be paired with a communication device 110 using an ad-hoc personal area network protocol 150, herein referred to as an ad-hoc personal area network device. An example of an ad-hoc personal area network protocol 150 may be Bluetooth®. The peripheral device may create a master-slave relationship with the communication device, with the peripheral device being the master accessory and the communication device 110 being the slave communication device 110. The master accessory may use a short range wireless network protocol, herein referred to as a master short range accessory.

Figure 2:
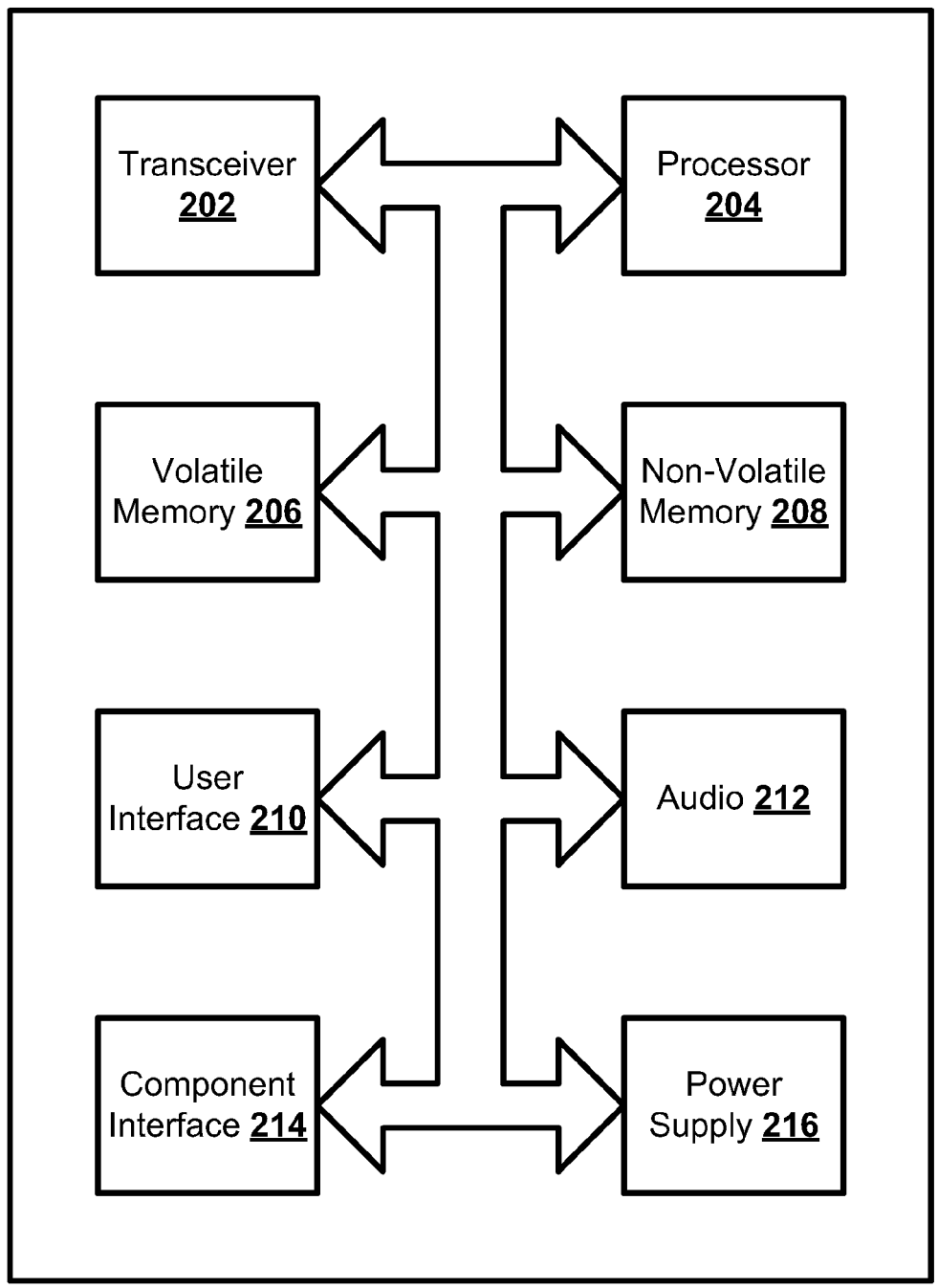
FIG. 2 illustrates, in a block diagram, one embodiment of a mobile telecommunication device.

FIG. 2 illustrates one embodiment of a computing device 200 that may be used as a communication device. The computing device 200 may support one or more applications for performing various communications with the network. The computing device 200 may implement any operating system, such as Windows or UNIX, for example. Client and server software may be written in any programming language, such as C, C++, Java or Visual Basic, for example. The computing device 200 may be a mobile phone, a laptop, a personal digital assistant (PDA), or other portable device. For some embodiments of the present invention, the computing device 200 may be a WiFi or Bluetooth® capable device. The computing device 200 may include a network interface 202, such as a transceiver, to send and receive data over the network.

The computing device 200 may include a controller or processor 204 that executes stored programs. The controller or processor 204 may be any programmed processor known to one of skill in the art. However, the disclosed method may also be implemented on a general-purpose or a special purpose computer, a programmed microprocessor or microcontroller, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, any device or devices capable of implementing the disclosed method as described herein can be used to implement the disclosed system functions of this invention.

The computing device 200 may also include a volatile memory 206 and a non-volatile memory 208 to be used by the processor 204. The volatile 206 and nonvolatile data storage 208 may include one or more electrical, magnetic or optical memories such as a random access memory (RAM, cache, hard drive, or other memory device. The memory may have a cache to speed access to specific data. The memory may also be connected to a compact disc-read only memory (CD-ROM), digital video disc-read only memory (DVD-ROM), DVD read write input, tape drive or other removable memory device that allows media content to be directly uploaded into the system.

The computing device 200 may include a user input interface 210 that may comprise elements such as a keypad, display, touch screen, or any other device that accepts input. The computing device 200 may also include a user output device that may comprise a display screen and an audio interface 212 that may comprise elements such as a microphone, earphone, and speaker. A short range transceiver 108, such as a Bluetooth® transceiver, may be connected to the computing device via a component interface 214. Finally, the computing device 200 may include a power supply 216.

Client software and databases may be accessed by the controller or processor 204 from the memory, and may include, for example, database applications, word processing applications, video processing applications as well as components that embody the disclosed functionality of the present invention. The computing device 200 may implement any operating system, such as Windows or UNIX, for example. Client and server software may be written in any programming language, such as C, C++, Java or Visual Basic, for example.

FIG. 3 illustrates one embodiment of a relay user interface accessory 300. The relay user interface accessory 300 may have an audio user interface 310 to interact verbally with one or more users. The audio user interface 310 may have an audio input 312, such as a microphone, to receive sound from the one or more users and an audio output 314, such as a speaker, to project sound to the one or more users. The relay user interface accessory 300 may have a power supply 320, such as a battery or a connection to a power grid. The relay user interface accessory 300 may have a central processor 330 that allows the relay user interface accessory 300 to perform various communication functions. Some of these functions may be performed by software modules executed by the central processor 330, a separate dedicated processor, or a separate circuit. The relay user interface accessory 300 may receive commands from the user via a user control interface 340. The user control interface 340 may be a set of inputs, such as buttons, a touch screen, or other input devices. Alternately, the user control interface 340 may be a voice recognition software module that receives audio commands from the user via the audio user interface 310. The relay user interface accessory 300 may have a data storage device 350 to store an audio data file of hold music or other audio hold indication to be transmitted over a primary audio connection while in a hold state.

The processor 340 may send and receive audio transmissions from the audio user interface 310 via a router circuit 360 to the personal area network interface 370. The personal area network interface 370 may conform to Bluetooth® protocol. The personal area network interface 370 may have multiple device interface components 372, allowing for multiple communication devices 110 to be actively paired with the relay user interface accessory 300. The router circuit 360 may select which transmission from which device interface component 372 of the personal area network interface 370 is transmitted on to the audio output 314, and which transmission is sent to which device component interface 372 of the personal area network interface 370. Alternately, the processor 330 may execute the routing function. The data storage device 350 may store pairing information for a communication device 200. By storing the pairing information, the relay user interface accessory 300 may potentially pair with multiple communication devices 200. The relay user interface accessory 300 may use a framework 380 to contain the different components. The framework 380 may be a headset, an automobile-integrated framework, or a conferencing speaker framework.

As stated previously, the relay user interface accessory 300 may connect to the communication device 200 by creating a personal area network 150. The personal area network may be a Bluetooth® network. Bluetooth® protocol may define different types of data links to be used to connect the relay user interface accessory 300 to the communication device 200, such as a synchronous connection oriented (SCO) link or an asynchronous connectionless link (ACL).

FIG. 4a illustrates a SCO link 400 for transferring audio between a relay user interface accessory 300 and a mobile telecommunication device 200. The synchronous, or circuit-switched, connection may be reserved for bandwidth communications, such as voice. The SCO link 400 may be created on a link manager protocol (LMP) level by reserving slots periodically on a physical channel. The SCO link 400 may be used to transport SCO packets, or voice data.

FIG. 4b illustrates an ACL 410 for transferring audio between a relay user interface accessory 300 and a mobile telecommunication device 200. The ACL 410 may be an asynchronous, or packet-switched, connection. The ACL 410 may be created on the LMP level. While the ACL 410 may be used to transmit ACL packet data, the ACL 410 may be used to transmit voice in a similar manner as is performed when executing voice over internet protocol (VOIP).

The relay user interface accessory 300 may actively pair with multiple communication devices 200. If the relay user interface accessory 300 is actively paired with multiple communication devices 200, the relay user interface accessory 300 may use a simulated, or virtual, "hold" to manage calls with the multiple communication devices. In a simulated hold, the relay user interface accessory 300 may maintain an audio connection with a communication device 200, with audio data passing between the relay user interface accessory 300 and the personal area network interface 370 of the communication device 200. However, in the simulated hold state, the relay user interface accessory may mute the audio connection by preventing the transfer of audio data between that audio connection and the audio user interface 310, in effect isolating the audio connection from the audio user interface 310. The hold may be considered simulated or virtual because the hold is managed by the relay user interface accessory 300, rather than in the network, as is done in traditional telephone holds.

Figure 5D:
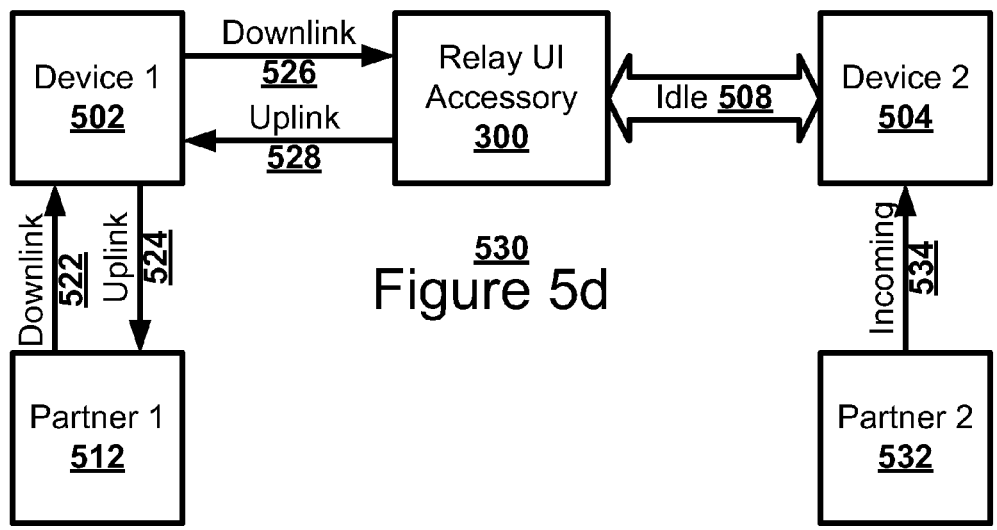

The FIGS. 5a-g illustrate one embodiment of a simulated hold. FIG. 5a illustrates an idle state 500 of the relay user interface accessory 300 paired with a primary communication device 502 and a secondary communication device 504. The relay user interface accessory 300 may create a primary idle pairing 506 with the primary communication device 504 and a secondary idle pairing 508 with the secondary communication device 508. The relay user interface accessory 300 may act as a master short range accessory to the multiple slave communication devices, including the primary slave communication device and the secondary slave communication device. References to a primary communication device 502 and a secondary communication device 504 merely refer to the order in which incoming calls are received if both devices are actively engaged in a telephone conversation session, and no further inferences are to be made. If only one communication device is actively engaged in a telephone conversation session, that communication device may be considered the primary communication device 502 regardless of the order in which the incoming calls were received. A communication device may be a primary communication device 502 in one sequence of calls and a secondary communication device 504 in a different sequence of calls.

FIG. 5b illustrates a primary communication device reception state 510. A primary communication partner 512 may direct a primary incoming call 514 to the primary communication device 502. Either the relay user interface accessory 300 or the primary communication device 502 may alert the user of the primary incoming call 514. If the user answers the call, the personal area network may enter a primary call state 520, as illustrated in FIG. 5c. The primary communication partner 512 may create a primary telephone conversation session with the primary communication device 502. The primary telephone conversation session may include a primary conversation downlink 522 and a primary conversation uplink 524. The primary communication device 502 may create a primary audio connection with the relay user interface accessory 300. The primary audio connection may include a primary audio downlink 526 and a primary audio uplink 528. The primary audio connection may transmit audio data between the relay user interface accessory 300 and the primary communication device 502.

Figure 5E:
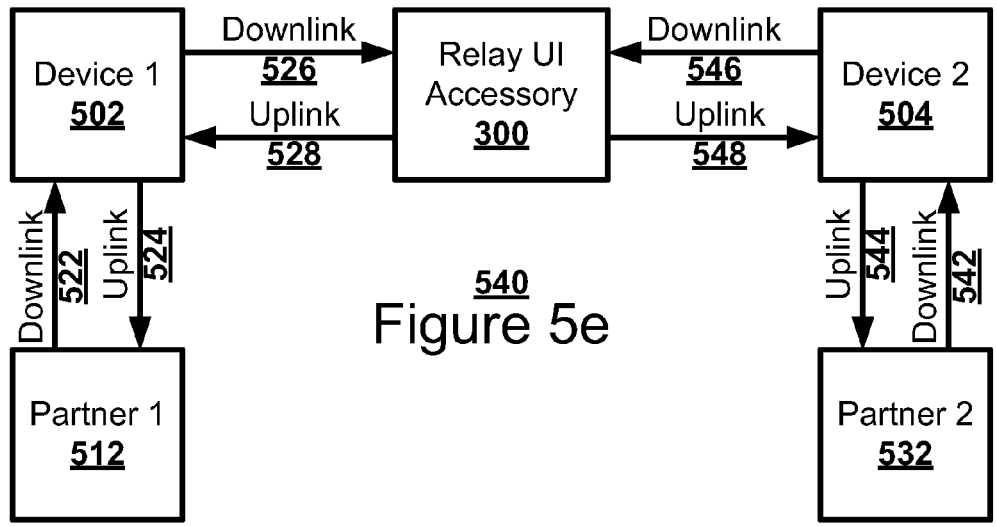

FIG. 5d illustrates a secondary communication device reception state 530. A secondary communication partner 532 may direct a secondary incoming call 534 to the secondary communication device 504. Either the relay user interface accessory 300 or the secondary communication device 504 may alert the user of the secondary incoming call 534. If the user answers the call, the personal area network may place the primary call on a simulated, or virtual, hold. From the viewpoint of the primary communication device 502, the call may be still live and active. The relay user interface accessory call 300 may send an audio hold indication to the primary communication partner 512 via the primary audio uplink 528 and the primary conversation uplink 524. The personal area network may enter a secondary call state 540, as illustrated in FIG. 5e. The secondary communication partner 532 may create a secondary telephone conversation session with the secondary communication device 504. The secondary telephone conversation session may include a secondary conversation downlink 542 and a secondary conversation uplink 544. The secondary communication device 504 may create a secondary audio connection with the relay user interface accessory 300. The secondary audio connection may include a secondary audio downlink 546 and a secondary audio uplink 548. The secondary audio connection may allow audio data to be transmitted between the relay user interface accessory 300 and the secondary communication device 504.

Once the secondary telephone conversation session has ended, the personal area network may enter the primary call state 520 or an idle state 500. Once the primary telephone conversation session has ended, the personal area network may enter an idle state 500. If the primary telephone conversation session ends while the secondary telephone conversation session is still active, the secondary communication device 504 may now be considered the primary communication device 502, and the personal area network may enter a primary call state 520.

Figure 6:
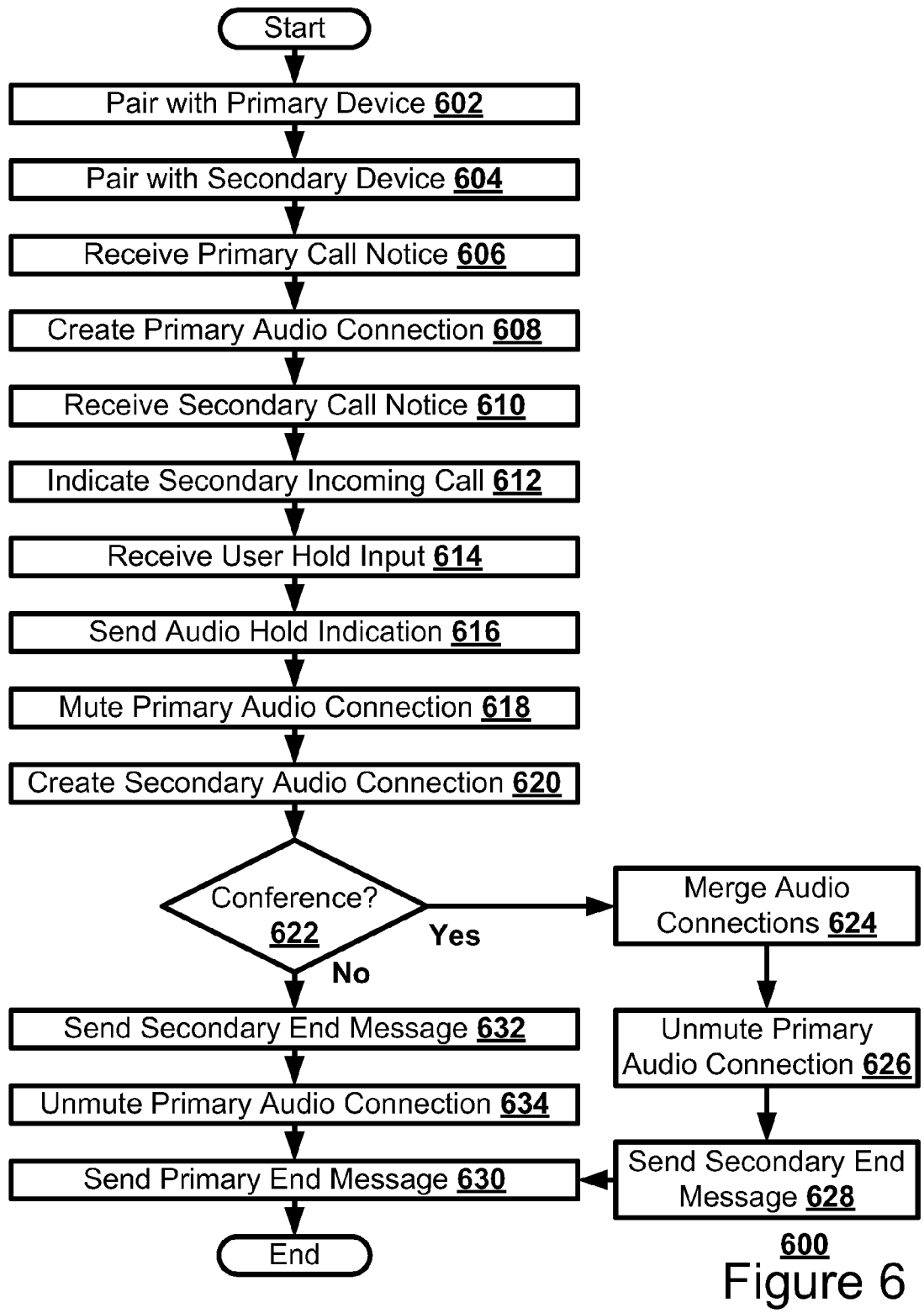
FIG. 6 illustrates, in a flowchart, one embodiment of a method for creating a simulated hold or a teleconference.

FIG. 6 illustrates, in a flowchart, one embodiment of a method 600 for creating a simulated hold or a teleconference. The relay user interface accessory 300 may pair with a primary mobile communication device 502 (Block 602). The relay user interface accessory 300 may pair with a secondary mobile communication device 504 (Block 604). The relay user interface accessory 300 may receive a primary incoming call notice from the primary mobile communication device 502 (Block 606). The relay user interface accessory 300 or the primary communication device 504 may notify the user of the primary incoming call. If the user accepts, the relay user interface accessory 300 may create a primary audio connection with the primary communication device 502 to facilitate a primary telephone conversation session with a primary communication partner 512 (Block 608).

The relay user interface accessory 300 may receive a secondary incoming call notice from the secondary mobile communication device 504 (Block 610). The relay user interface accessory 300 may indicate the secondary incoming call to the user (Block 612). For example, the relay user interface accessory 300 may insert a beep into the audio transmission of the primary telephone conversation session. The relay user interface accessory 300 may receive a user hold input via the user control interface 350 (Block 614). The relay user interface accessory 300 may send an audio hold indication to the secondary communication partner (Block 616). The relay user interface accessory 300 may mute the primary audio connection (Block 618). While the relay user interface accessory 300 is muting the primary audio connection, an audio signal may still be sent, just not to and from the audio user interface 310. The audio on the primary audio uplink and the primary audio downlink may be muted, while still maintaining the primary audio connection. While muted, the relay user interface accessory 300 may abstain from relaying the audio signal received from primary communication device 502, via the primary audio connection, to the user, via the audio output 314 of the relay user interface accessory 300. Further, the relay user interface accessory 300 may abstain from relaying the audible signal detected at the audio input 312 of the relay user interface accessory 300 to the primary communication device 502, via the primary audio connection. In some instances the relay user interface accessory 300 may alternatively relay an audio signal indicative of a hold status, such as a hold message or hold music, to the primary communication device 502 via the primary audio connection. The relay user interface accessory 300 may create a secondary audio connection with the secondary communication device 504 to facilitate a secondary telephone conversation session with a secondary communication partner 532 (Block 620).

If the relay user interface accessory 300 receives a conferencing indication from the user (Block 622), the relay user interface accessory 300 may merge the primary audio connection and the secondary audio connection (Block 624). The router module 360 may merge the primary audio connection and the secondary connection by relaying audio between the audio user interface 310, the primary audio connection, and the secondary audio connection. The relay user interface accessory 300 may unmute the primary audio connection (Block 626). When the teleconference ends, the relay user interface accessory 300 may send a secondary end message to the secondary communication device 504 to end the secondary telephone conversation session (Block 628).

If the relay user interface accessory 300 does not receive a conferencing indication from the user (Block 622), when the secondary conversation ends, the relay user interface accessory 300 may send a secondary end message to the secondary communication device 504 to end the secondary telephone conversation session when the user indicates completion of the second conversation (Block 632). The relay user interface accessory 300 may unmute the primary audio connection (Block 634). The relay user interface accessory 300 may send a primary end message to the primary communication device 504 to end the primary telephone conversation session when the user indicates completion of the first conversation (Block 630).

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Embodiments may also be practiced in distributed computing environments where tasks are performed by local and remote processing devices that are linked (either by hardwired links, wireless links, or by a combination thereof) through a communications network.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Although the above description may contain specific details, they should not be construed as limiting the claims in any way. Other configurations of the described embodiments of the invention are part of the scope of this invention. For example, the principles of the invention may be applied to each individual user where each user may individually deploy such a system. This enables each user to utilize the benefits of the invention even if any one of the large number of possible applications do not need the functionality described herein. In other words, there may be multiple instances of the electronic devices each processing the content in various possible ways. It does not necessarily need to be one system used by all end users. Accordingly, the appended claims and their legal equivalents should only define the invention, rather than any specific examples given.

We claim:

1. A method for executing a simulated network hold with a relay user interface accessory paired with a primary communication device using a short range wireless communication connection and paired with a secondary communication device using a short range wireless communication connection, the method comprising:

creating a primary audio data connection between the relay user interface accessory and the primary communication device to facilitate a primary telephone conversation session with a primary communication partner where the primary audio data connection access a telecommunication network through the primary communication device for the relay user interface;

creating a secondary audio data connection between the relay user interface accessory and the secondary communication device to facilitate a secondary telephone conversation session with a secondary communication partner while maintaining the primary audio connection where the secondary audio data connection access a telecommunication network through the secondary communication device for the relay user interface; and sending audible signals from the relay user interface accessory, the audible signals including audible speech signals of the secondary telephone conversation session.

2. The method of claim 1, further comprising:

muting audible signals from the primary audio data connection while the relay user interface accessory maintains the primary audio data connection with the primary communication device and while sending audible signals of the secondary telephone conversation session from the relay user interface accessory.

3. The method of claim 2, further comprising:
sending a secondary end message to the secondary communication device to end the secondary telephone conversation session; and
unmuting audible signals from the primary audio data connection.

4. The method of claim 1, further comprising:
merging audio from the primary audio data connection and audio from the secondary audio data connection to create a teleconference session at the relay user interface accessory.

5. The method of claim 1,
where the relay user interface accessory is paired with the primary communication device and is paired with the secondary communication device using Bluetooth.

6. The method of claim 1, wherein the relay user interface accessory is at least one of a headset, an automobile-integrated user interface, and a conferencing speaker interface.

7. The method of claim 1, further comprising:
creating the primary audio data connection on a primary asynchronous connectionless link; and
creating the secondary audio data connection on a secondary asynchronous connectionless link.

8. The method of claim 1, further comprising:
creating the primary audio data connection on a primary synchronous connection-oriented link; and
creating the secondary audio data connection on a secondary synchronous connection-oriented link.

9. The method of claim 1, wherein the relay user interface accessory comprises a relay user interface accessory microphone configured to receive audible speech signals of a telephone conversation and a relay user interface accessory speaker configured to output audible speech signals of a telephone conversation.

10. The method according to claim 1, further comprising receiving, at the relay user interface accessory, an incoming call notification from the primary communication device.

11. The method according to claim 10, further comprising receiving, at the relay user interface accessory, an incoming call notification from the secondary communication device.

12. A master short range accessory paired with multiple slave communication devices, comprising:
a primary device interface component that creates a short range wireless communication primary audio data connection with a primary slave communication device to facilitate a primary telephone conversation session with a primary communication partner where the primary audio data connection access a telecommunication network through the primary slave communication device for the master short range accessory; and
a secondary device interface component that creates a short range wireless communication secondary audio data connection with a secondary slave communication device to facilitate a secondary telephone conversation session with a secondary communication partner while maintaining the primary audio data connection where the secondary audio data connection access a telecommunication network through the secondary slave communication device for the master short range accessory; and
an audio user interface physically connected to the master short range accessory, where the audio user interface accessory provides audible signals to a user, the audible signals including audible speech signals of the primary telephone conversation session, and the audible signals including audible speech signals of the secondary telephone conversation session.

13. The master short range accessory of claim 12, further comprising:
a processor that sends an audio hold indication to the primary communication partner, mutes a primary audio input, and transmits a hold music on a primary audio output.

14. The master short range accessory of claim 13, wherein the processor sends a secondary end message to the secondary slave communication device to end the secondary telephone conversation session and unmutes the primary audio data connection.

15. The master short range accessory of claim 12, further comprising:
a router that merges the primary audio data connection and the secondary audio data connection to create a teleconference session at the master short range accessory.

16. The master short range accessory of claim 12, wherein the primary device interface component and the secondary device interface component conform to Bluetooth protocol.

17. The master short range accessory of claim 12, wherein the primary device interface component creates the primary audio data connection on a primary asynchronous connectionless link and the secondary device interface component creates the secondary audio data connection on a secondary asynchronous connectionless link.

18. The master short range accessory of claim 12, wherein the primary device interface component creates the primary audio data connection on a primary synchronous connection oriented link and the secondary device interface component creates the secondary audio data connection on a secondary synchronous connection oriented link.

19. The master short range accessory of claim 12, further comprising:
a user control interface that receives a user command from a user to select between the primary audio data connection and the secondary audio data connection.

20. An ad hoc personal area network device paired with multiple mobile communication devices, comprising:
an audio user interface that interacts with a user;
a short range wireless communication primary device interface component that creates a primary audio data connection with a primary mobile communication device to facilitate a primary telephone conversation session with a primary communication partner where the primary audio data connection access a telecommunication network through the primary mobile communication device for the ad hoc personal area network device;
a processor that sends an audio hold indication to the primary communication partner and mutes the primary audio connection; and
a short range wireless communication secondary device interface component that creates a secondary audio data connection with the secondary mobile communication device to facilitate a secondary telephone conversation session with a secondary communication partner while maintaining the primary audio connection where the secondary audio data connection access a telecommunication network through the secondary mobile communication device for the ad hoc personal area network device, wherein the audio user interface provides audible signals to the user, the audible signals including audible speech signals of the primary telephone conversation session, and the audible signals including audible speech signals of the secondary telephone conversation session.

21. The ad hoc personal area network device of claim 20, further comprising:

a framework that contains the processor and the short range wireless communication primary device interface component, the framework being at least one of a headset, an automobile-integrated framework, and a conferencing speaker framework.

22. The ad hoc personal area network device of claim 20, further comprising:

a data storage device that stores a music data file to be transmitted over the primary audio data connection while in a hold state.

\* \* \* \* \*